Figure 1:
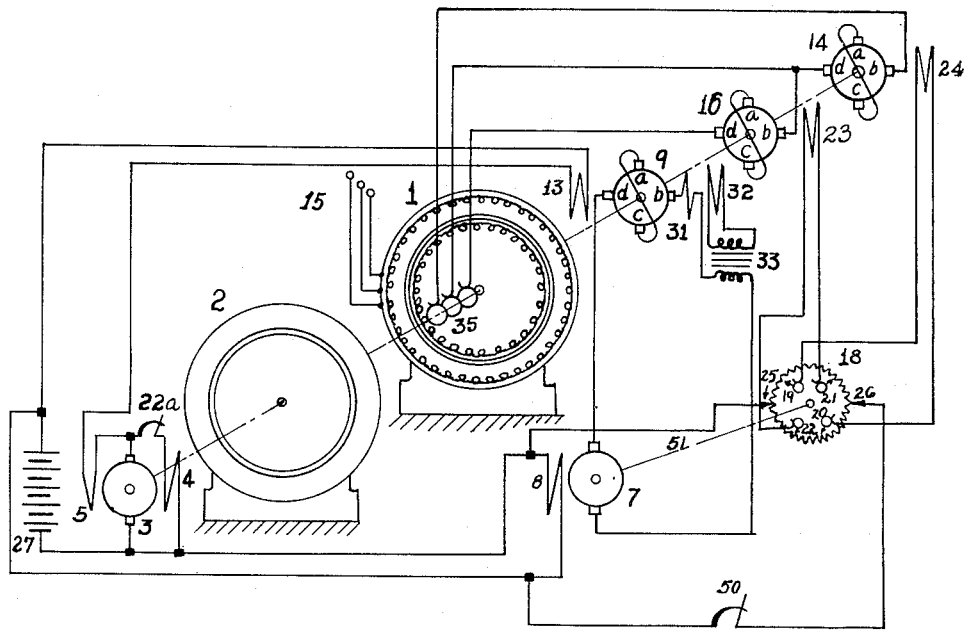

Nov. 24, 1953  J. M. PESTARINI  2,660,701
SPEED CONTROL OF ELECTRIC MACHINES
Filed Sept. 23, 1948  2 Sheets-Sheet 1

INVENTOR.

Nov. 24, 1953  J. M. PESTARINI  2,660,701
SPEED CONTROL OF ELECTRIC MACHINES
Filed Sept. 23, 1948  2 Sheets-Sheet 2

INVENTOR.
J. M. Pestarini

Patented Nov. 24, 1953

2,660,701

UNITED STATES PATENT OFFICE 2,660,701

SPEED CONTROL OF ELECTRIC MACHINES

Joseph Maximus Pestarini, Staten Island, N. Y.

Application September 23, 1948, Serial No. 50,733

8 Claims. (Cl. 318—197)

This invention relates to alternating current machines rotating at a speed different from the speed corresponding to their synchronous speed.

It is often desired to have alternating machines with their shaft rotating at a speed different from the one corresponding to the synchronous speed relative to the frequency of the currents supplying the machine with energy, say through its stator windings. Such a result may be obtained by supplying the rotor with a polyphase system of windings fed by an auxiliary alternating current source of an adequate frequency. In this case the absolute rotational speed of the shaft will be the algebraic sum of the absolute rotational speed of the magnetic field created by the current traversing the stator windings and the relative rotational speed of the field created by the currents of the rotor windings with respect to the said rotor.

This invention discloses means controlling the frequency of the auxiliary alternating polyphase currents and their amplitude.

Such means consists essentially in a regulator dynamo rotating at a speed proportional to the absolute speed of the shaft and able to supply a current, varying very quickly for small speed variations from the desired value and after amplification, driving the auxiliary alternating current generator which energizes the rotor windings of the main machine.

The auxiliary alternating current generator, supplying the rotor of the main machine with an auxiliary system of polyphase currents, may be an alternator. In this case the auxiliary system of currents has a current intensity which decreases quickly towards zero when the frequency of said auxiliary system of currents decreases towards zero, leaving the rotor of the main machine insufficiently excited for low values of said frequency and not excited at all when said frequency becomes zero. This invention discloses special generators creating currents, the intensity of which is independent of their frequency, and which become direct currents of a predetermined intensity when the frequency becomes zero.

Two kinds of auxiliary alternating current generators of the latter type are disclosed in this invention, the first one essentially consisting of a circular rheostat upon which a polyphase system of sliding contacts move, collecting a polyphase system of currents; the second variant consists in a polyphase system of brushes sliding along the commutator of an auxiliary dynamo having its armature rotating with respect to its field inductor.

The thus obtained auxiliary alternating currents are generally amplified preferably by means of amplifying metadynes, one metadyne being used for each phase of the auxiliary polyphase system.

Some examples of application of this invention are given below, references being made to the accompanying drawings.

Figure 2:
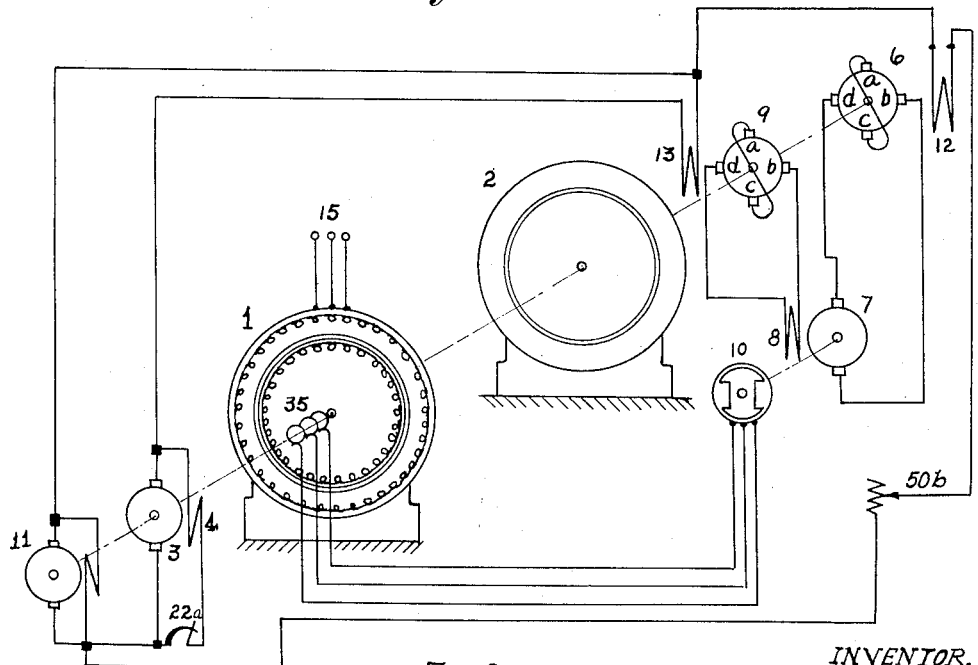
Figure 3:
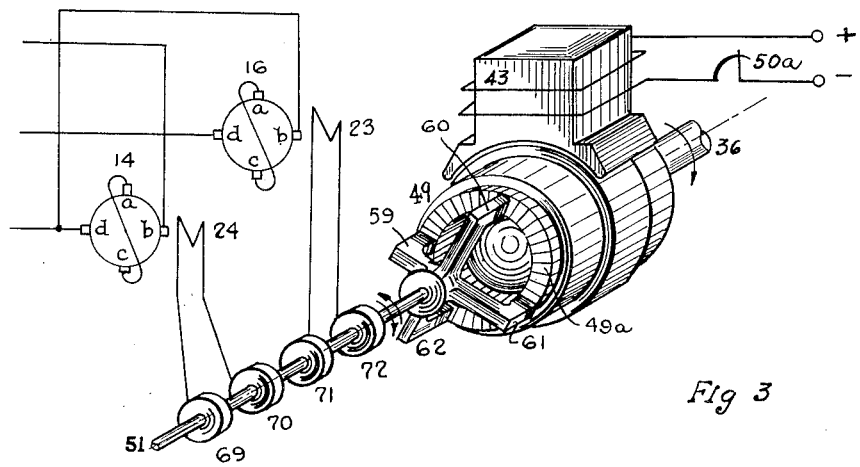
Figure 4:
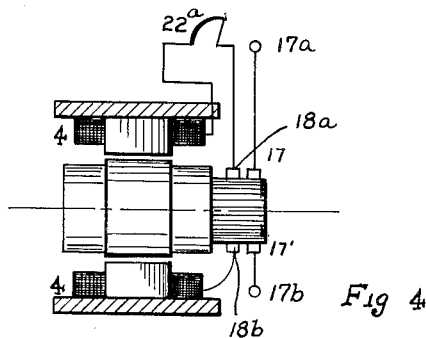
Figure 5:
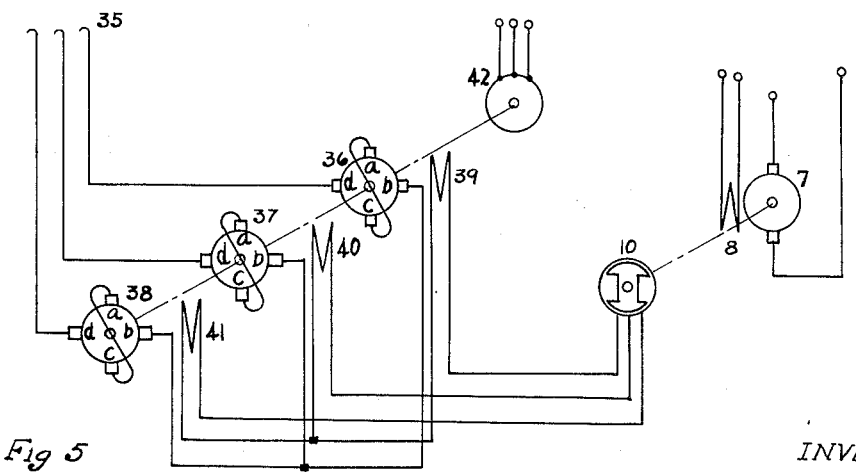

Figure 1 gives the complete scheme with the auxiliary alternating current generator of the kind comprising a circular rheostat; Figure 2 shows the variant for which the auxiliary generator is an alternator; Figure 3 gives a view of the auxiliary alternating polyphase generator being a dynamo with a polyphase system of sliding brushes; Figure 5 gives a scheme for the amplification of the auxiliary alternating polyphase currents; Figure 4 shows an improvement of the regulator dynamo.

In Figure 1, two main machines 1 and 2 are indicated directly coupled on the same shaft. The machine 1 is an alternating current motor having its stator fed through its terminals 15 by a three phase current source not shown. Its rotor is indicated bearing a polyphase winding traversed by currents carried through the sliprings 35. The machine 1 is adapted to drive machine 2 which is any desired load creating device, at a predetermined speed.

A regulator dynamo 3 is coupled on the same shaft as the main machines. Said regulator dynamo is provided with a shunt field winding 4 and connected to a battery 27 through low resistance windings 5, 13. A rheostat 22a is inserted in the circuit of the field winding 4 for setting the resistance of said circuit.

While a conventional dynamo supplying direct current is set to operate with its magnetic circuit substantially saturated in order to reach stability of operation, a regulator dynamo is set to operate with its magnetic circuit unsaturated and the resistance of its excitation circuit is set at such a value allowing for a rapid variation of the armature current close to its limit of stability.

In order to obtain an operation at the very limit of stability of the current, the conductance which is the inverse of the resistance, of the circuit in which the main field winding 4 is inserted, is set through the rheostat 22a to be equal to the ratio of the exciting current traversing the field winding 4 to the electromotive force induced by the armature of the regulator dynamo 3 when the absolute rotational speed of the shaft has a desired value, the magnetic circuit of the regulator dynamo 3 being completely unsaturated. Under these conditions, the regulator dynamo will supply or absorb a current which varies very quickly for even slight departures from the desired value of the speed of the shaft.

The regulator dynamo and its action has been described in many previous patents, see Patent 1,962,020. Its main excitation may be a shunt or series excitation.

The current supplied or absorbed by the regulator dynamo, referred to as regulator current, traverses the variator winding 13 of an amplifying metadyne 9 supplying though its secondary brushes b and d current to the armature of an auxiliary dynamo 7 which is separately excited by the field winding 8 connected to the direct current source 27.

The regulator current of even very small intensity is amplified through the amplifying metadyne 9 to any desired value for supplying the auxiliary dynamo 7 with the current necessary to cause this dynamo to drive, by means of the shaft 51, a polyphase system of contacts 19, 20, 21 and 22 sliding along a circular resistor 18 fed at two diametrical opposite points 25 and 26 by direct current supplied by battery 27 and of an intensity set through the rheostat 50.

The amplifying metadyne has been described in United States Patent 2,112,604 March 29, 1938.

The amplifying metadyne may be provided with an anti-hunting member in the form of winding 32 connected across the secondary winding of a transformer 33, the primary of which is inserted into the armature circuit of the auxiliary driving dynamo 7. The action of this anti-hunting means is clearly explained in the United States Patent 2,203,544, June 4, 1940. Similarly, the secondary compensating or hypo-compensating winding 31 is connected between secondary brush b of metadyne 9 and the armature of dynamo 7. The action of this winding is clearly explained in the British Patent 420,167, November 27, 1934.

The auxiliary alternating currents collected by means of the sliding contacts 19, 20, 21 and 22 are supplied to the secondary windings 23 and 24 of the amplifying metadynes 16 and 14 respectively. The metadynes 16, 14 supply alternating current through their secondary brushes b and d to the rotor of the main machine 1 by means of sliprings 35.

In order to increase the sensitivity of the regulator dynamo 3 to the speed variations of its shaft, an auxiliary series connected field excitation 5 may be provided for compensating a part of the ohmic drop of the external circuit of the regulator dynamo. A further improvement of the regulator dynamo is schematically indicated by Figure 4 where a pair of main brushes 17 and 17' for collecting the main current absorbed or supplied by the regulator dynamo are connected to the main terminals 17a, 17b which are adapted to be connected to metadyne winding 13 shown in Fig. 1. The auxiliary brushes 18a and 18b are connected to the shunt field excitation 4. This arrangement allows for the field shunt excitation current to be independent from the variable brush voltage drop that occurs under the main brushes 17 and 17'. The setting resistor 22a is indicated inserted in the circuit of the shunt field excitation 4.

In many applications it is desired to vary the speed of the shaft of machine 1 and this is easily obtained by varying the resistance of the resistor 22a inserted in the circuit of the field winding of the regulator dynamo. The actuating means of the resistor 22a may be operated by hand or automatically in response to predetermined operational characteristics of the system.

It is important to notice that the intensity of the auxiliary polyphase system of currents feeding the rotor of the main machine 1 is practically independent from the value of the frequency of the said currents and depends only on the setting of the resistor 50. Thus when the frequency of the auxiliary polyphase alternating currents is zero, the rotor of the main machine 1 is fed by a system of direct currents, the amplitude of which depends solely on the setting of the resistor 50.

Polyphase currents may be supplied to the machine 1 by means of a dynamo 49 as indicated by Figure 3. The armature of the dynamo is driven by the shaft 36 and rotates with respect to its field inductor 43. A system of angularly displaced polyphase brushes 59, 60, 61 and 62 rotatably contact the commutator 49a of the dynamo 49. The brushes 59, 60, 61, 62 are mounted on the shaft 51 by the auxiliary dynamo 7 of Figure 1. The polyphase system of currents collected through the above mentioned polyphase system of brushes is carried through the sliprings 69, 70, 71 and 72 for supply to the windings 23, 24 of the metadynes 14, 16, as previously described.

When the polyphase system of brushes 59, 60, 61, 62 is at rest, and the regulator current is zero, the rotation of the dynamo armature through shaft 36, provides direct currents collected by the polyphase system of brushes are supplied to metadynes 14, 16. The amplitude of such direct currents depends on the setting of the resistor 50a inserted in the circuit of the field winding of the dynamo 49. The said resistor controls the amplitude of the auxiliary alternating polyphase currents independently from their frequency when the shaft 51 is rotating.

Figure 2 shows a variant arrangement. The two main machines 1 and 2 are directly mechanically coupled to the regulator dynamo 3 which is shunt excited by its field winding 4 and connected to a direct current source which takes the form of a shunt excited saturated dynamo 11. The regulator current traverses the secondary variator winding 13 of an amplifying metadyne 9, the secondary brushes b, d which energize the field excitation 8 of an auxiliary dynamo 7. The armature of the latter is energized by a constant current supplied by the amplifying metadyne 6, the intensity of which is determined by the value of the current traversing the secondary variator winding 12 and being set by a resistor 50b in series therewith.

The auxiliary dynamo 7 drives an auxiliary alternator 10 which in its turn supplies a system of auxiliary alternating polyphase currents to the rotor of the main machine 1 through the sliprings 35.

The value of the speed of the common shaft connecting main machines 1 and 2 may be modified by setting the resistor 22a inserted in the circuit of the field winding 4 of the regulator dynamo 3. The modification of the resistor 22a may be made by hand or automatically in response to variations in the operational characteristics of the system.

The auxiliary alternating polyphase currents supplied by the alternator 10 are generally amplified preferably by means of amplifying metadynes. One metadyne being used for each phase of the polyphase system as indicated by Figure 5 where each of the three phase currents supplied by the alternator 10 traverses the secondary variator windings 39, 40 and 41 respectively of the amplifying metadynes 36, 37 and 38 respectively. The latter are driven by a motor 42.

The amplifying metadynes have been generally indicated in their simplest scheme but they may be provided with anti-hunt and compensating windings as previously described.

The scheme of Figure 2 does not allow for the excitation of the rotor of the main machine 1 when the regulator current is zero. Therefore this scheme can be applied only when the speed of the shaft must be always different from the synchronous speed corresponding to the frequency of the terminals 15. On the contrary, the schemes involving the circular resistor 18 with a sliding polyphase system of contacts or the auxiliary dynamo 49 of Figure 3 with a sliding system of polyphase brushes can be applied without the above mentioned limitation.

In Figure 1 the control of the speed of the auxiliary dynamo 7 is obtained through the regulator current traversing, after amplification, the armature of the auxiliary dynamo 7 while on Figure 2 the same result is obtained through the regulator current traversing, after amplification, the field winding of the auxiliary dynamo 7.

I claim:

1. A power system comprising an induction motor including a pair of polyphase windings, a circuit including a regulator dynamo coupled to said induction motor and adapted to create a current in said circuit varying rapidly with a slight variation from a predetermined speed of said induction motor, rotatable means for providing polyphase currents having a frequency determined by the rotational speed thereof, and comprising a generator including a field inductor, an armature associated with a commutator rotatable with respect to said field inductor and a polyphase system of brushes rotatable about said commutator for collecting a polyphase system of currents having a frequency determined by the relative motion between said system of brushes and said field inductor, an electric motor for rotating said system of brushes, means for amplifying the current of said circuit and for supplying said amplified current to said electric motor for controlling the speed thereof, said generator being connected in circuit with one of said polyphase windings of said induction motor, the other of said polyphase windings of said induction motor being adapted to be energized by a polyphase network.

2. A power system comprising an induction motor including a pair of polyphase windings, a regulator dynamo having a shunt excitation winding and an unsaturated magnetic circuit, said regulator dynamo being mechanically coupled to said motor for providing a control current changing with a slight variation from a predetermined speed of said motor, rotatable means for providing polyphase currents having a frequency determined by the rotational speed thereof, an electric motor for rotating said rotatable means, rotatable dynamo electric amplifying means mechanically coupled to said induction motor for amplifying said control current and supplying the amplified current to said electric motor for controlling the speed thereof, said polyphase current providing means being connected in circuit with one of said pair of polyphase windings, the other of said pair of polyphase windings being adapted to be energized by a polyphase network.

3. A power system as in claim 2, wherein said electric motor comprises an armature, and said amplifying dynamo electric means comprises an armature provided with a pair of short circuited primary brushes, a pair of secondary brushes in circuit with said electric motor armature and a stator winding in circuit with said regulator dynamo.

4. A power system as in claim 2 and further including a second rotatable amplifying dynamo electric means mechanically coupled to said induction motor for amplifying the polyphase currents supplied by said first mentioned rotatable means and supplying said amplified polyphase currents to said one polyphase winding.

5. A power system as in claim 2 and further including means for regulating the resistance of the excitation winding of said regulator dynamo.

6. A power system as in claim 2 wherein said regulator dynamo comprises an armature provided with a pair of brushes in circuit with said excitation winding and a second pair of brushes in circuit with said amplifying means.

7. A power system as in claim 2, wherein said electric motor comprises a field winding, and said amplifying dynamo electric means comprises an armature provided with a pair of short circuited primary brushes, a pair of secondary brushes in circuit with the field winding of said electric motor and a stator winding in circuit with said regulator dynamo.

8. A power system comprising an induction motor including a pair of polyphase windings, a regulator dynamo coupled to said motor for providing a control current varying rapidly with a slight variation from a predetermined speed of said motor, means for providing polyphase currents having a frequency determined by the rotational speed thereof comprising a closed circuit resistor, and a plurality of polyphase contact members rotatably related thereto, an electric motor for rotating said contact members, means for amplifying said control current and supplying said amplified current to said electric motor for controlling the speed thereof, a direct current source, means for connecting said direct current source to said resistor at preselected points thereof, means for connecting the output of said polyphase current providing means to one of said pair of polyphase windings, the other of said pair of polyphase windings being adapted to be energized by a polyphase network.

JOSEPH MAXIMUS PESTARINI.

References Cited in the file of this patent

UNITED STATES PATENTS

| Number | Name | Date |
|---|---|---|
| 1,479,174 | Dudley et al. | Jan. 1, 1924 |
| 1,481,705 | Huey | Jan. 29, 1924 |
| 1,598,268 | De Coninck | Aug. 31, 1926 |
| 1,637,393 | Shand | Aug. 2, 1927 |
| 1,709,120 | Dreyfus | Apr. 16, 1929 |
| 1,962,030 | Pestarini | June 5, 1934 |
| 1,967,107 | Thurston | July 17, 1934 |
| 2,106,014 | Pestarini | Jan. 18, 1938 |
| 2,344,828 | Longwell | Mar. 21, 1944 |